(12) United States Patent
Takata et al.

(10) Patent No.: US 8,757,342 B2
(45) Date of Patent: Jun. 24, 2014

(54) SLIDING FRICTION MATERIAL

(75) Inventors: Tomoya Takata, Toyama (JP);
Takayuki Sanga, Toyama (JP); Makoto Suda, Toyama (JP)

(73) Assignee: Tanaka Seimitsu Kogyo Co., Ltd., Toyama (JP)

( * ) Notice: Subject to any disclaimer, the term of this patent is extended or adjusted under 35 U.S.C. 154(b) by 282 days.

(21) Appl. No.: 13/266,196

(22) PCT Filed: Mar. 11, 2010

(86) PCT No.: PCT/JP2010/054105
§ 371 (c)(1),
(2), (4) Date: Nov. 22, 2011

(87) PCT Pub. No.: WO2010/140412
PCT Pub. Date: Dec. 9, 2010

(65) Prior Publication Data
US 2012/0067691 A1    Mar. 22, 2012

(30) Foreign Application Priority Data

Jun. 4, 2009    (JP) ................................ 2009-134683

(51) Int. Cl.
*F16D 23/06* (2006.01)
*F16D 13/26* (2006.01)
*F16D 13/66* (2006.01)
*F16D 69/00* (2006.01)
*F16D 69/02* (2006.01)

(52) U.S. Cl.
USPC ............... 192/66.2; 192/53.34; 192/107 R; 192/107 M

(58) Field of Classification Search
USPC ................... 192/66.2, 53.34, 107 M
See application file for complete search history.

(56) References Cited

U.S. PATENT DOCUMENTS 2,965,205 A * 12/1960 Winchell .................... 192/66.23
5,038,628 A * 8/1991 Kayama ........................ 74/339

(Continued)

FOREIGN PATENT DOCUMENTS

JP    60-167234 U    11/1985
JP    5-14660 U    2/1993

(Continued)

OTHER PUBLICATIONS

English translation of Written Opinion of the International Searching Authority issued Apr. 20, 2010 in corresponding International Application No. PCT/JP2010/054105.

(Continued)

*Primary Examiner* — Richard M. Lorence
(74) *Attorney, Agent, or Firm* — Wenderoth, Lind & Ponack, L.L.P.

(57) ABSTRACT

For reduction in size and weight, friction materials aiming at a high coefficient of kinetic friction have been developed. However, friction materials with a high coefficient of kinetic friction may cause sticking to a sliding partner material and deteriorated feeling in operation in particular in the initial running-in period during the initial stage of use. Therefore, the use of friction materials with a high coefficient of kinetic friction has been restricted. Since such sticking to the sliding partner material is less likely to occur after experiencing an initial running-in period, developed was a friction material in a form that is effective in prevention of sticking during the initial running-in period. Among sliding surfaces 5 between the friction material 3 and the sliding partner material 7, only the initial sliding surface 5', or only the initial sliding surface 5' and the vicinity thereof are in contact during the initial running-in period, and the area in contact with the sliding partner material gradually increases over time to full-area contact, that is, full contact of the whole sliding surfaces 5. The above constitution provides a sliding friction material having excellent sticking resistance with excellent friction performance and abrasion resistance.

20 Claims, 5 Drawing Sheets

(56) References Cited

U.S. PATENT DOCUMENTS

| | | |
|---|---|---|
| 5,918,718 A | 7/1999 | Jahn et al. |
| 5,969,001 A | 10/1999 | Kawai |
| 2006/0257647 A1 | 11/2006 | Takagi et al. |

FOREIGN PATENT DOCUMENTS

| | | |
|---|---|---|
| JP | 5-52366 U | 7/1993 |
| JP | 9-221553 A | 8/1997 |
| JP | 10-73131 A | 3/1998 |
| JP | 2004-144109 A | 5/2004 |
| WO | 2004/109138 A1 | 12/2004 |

OTHER PUBLICATIONS

International Search Report issued Apr. 20, 2010 in corresponding International Application No. PCT/JP2010/054105.

* cited by examiner

SLIDING FRICTION MATERIAL

TECHNICAL FIELD

The present invention relates to a sliding friction material having improved sticking resistance with unimpaired abrasion resistance and friction performance.

In particular, the present invention relates to a friction material for synchronizer rings having improved stick resistance (degree of inhibition of sticking to a conical sliding surface of a partner gear with a relative rotation speed near zero).

BACKGROUND ART

A sliding friction material is a material which utilizes frictional force to absorb the relative velocity of a sliding partner material in sliding contact therewith, and is used for vehicular brake pads, clutch discs, synchronizer rings, or the like.

In recent years, while performances of engines and transmissions have been increased, reduction in weight has also been required for fuel efficiency, and the size of each constituent part has been minimized. In the circumstances, in addition to reliable operation, operational characteristics sufficient even in a smaller size are required. As sliding friction materials, one with a high coefficient of kinetic friction is desired.

In order to improve the friction characteristics of sliding friction materials, various combinations of friction material components have been suggested, and sliding friction materials with a high coefficient of kinetic friction have been developed. For example, already known is a friction material layer which comprises a thermosetting resin as a binder, and a carbon material, a metallic material, and an inorganic material blended therein (see Patent Literature 1 and 2). The patent literature describes, as means for obtaining high friction performance and high durability of a friction material for synchronizer rings, blending as a main component an appropriate amount of a highly pure carbon material having a low ash content (a petroleum coke or a pitch coke) in the friction material layer.

CITATION LIST

[Patent Literature]
    [Patent Literature 1] WO 2004/109138
    [Patent Literature 2] JP 09-221553 A

SUMMARY OF INVENTION

Technical Problem

There have been many reports including the above patent publications regarding combinations of material components aiming at a high coefficient of kinetic friction. However, due to sliding resistance, combinations of material components aiming at a high coefficient of kinetic friction problematically cause sticking to a sliding partner material especially in the initial running-in period during the initial stage of use, resulting in deteriorated feeling in operation. Therefore, the use of friction materials with a high coefficient of kinetic friction has been restricted.

Accordingly, an object of the present invention is to provide a sliding friction material having excellent sticking resistance with excellent friction performance and abrasion resistance.

Solution to Problem

The present inventors have wholeheartedly carried out investigations to solve the above problem. As a result, the inventors found that, when a sliding friction material is formed in such a shape that the area of sliding surfaces in contact with the sliding partner material is at the beginning of use only part of the whole area of the sliding surfaces but gradually increases over time to full-area contact during the initial running-in period, sticking resistance in the initial running-in period is improved without impairing abrasion resistance or friction performance. Based on the findings, the inventors conducted further research and completed the present invention.

That is, the present invention relates to:
(1) a sliding friction material characterized by that sliding surfaces thereof are only partially in contact with the sliding surface of a sliding partner material at the beginning of use and by that the area in contact with the sliding partner material gradually increases over time to full-area contact during the initial running-in period,
(2) the sliding friction material according to the above (1), wherein the relative angle of the sliding surfaces of the sliding friction material to the sliding surface of the sliding partner material before the initial running-in period is 1 to 40 minutes,
(3) the sliding friction material according to the above (1) or (2), wherein the highest sliding surface having contact with the sliding partner material first is 0.01 mm or more higher than the lowest sliding surface before the initial running-in period,
(4) the sliding friction material according to any one of the above (1) to (3), which has a groove on the surface thereof,
(5) the sliding friction material according to any one of the above (1) to (4), comprising 5 to 40 wt % of phenolic resin relative to the whole sliding friction material,
(6) the sliding friction material according to the above (5), further comprising 30 to 80 wt % of carbon material, 5 to 40 wt % of inorganic fibers or inorganic particles, and if desired 5 to 40 wt % of metal fibers or metal particles, the total amount of the above-mentioned components being 100 wt % or less relative to the whole sliding friction material,
(7) the sliding friction material according to any one of the above (1) to (6), which is a friction material for synchronizer rings,
(8) the sliding friction material according to the above (7), wherein the axial width of a land including a site having contact with the sliding surface of the sliding partner material first is 0.1 to 1.0 mm, and more preferably 0.1 to 0.7 mm,
(9) a sliding friction material for synchronizer rings characterized by that sliding surfaces thereof are only partially in contact with the sliding surface of a sliding partner material at the beginning of use and by that the area in contact with the sliding partner material gradually increases over time to full-area contact, the relative angle of the sliding surfaces of the sliding friction material to the sliding surface of the sliding partner material before the initial running-in period being 1 to 20 minutes, the surface of the sliding friction material having a circumferential groove, the axial width of a land including a site having contact with the sliding surface of the sliding partner material first being 0.1 to 0.7 mm, the sliding friction material comprising 5 to 40 wt % of phenolic resin relative to the whole sliding friction material, and further comprising 30 to 80 wt % of carbon material, 5 to 40 wt % of inorganic fibers or inorganic particles, and if desired 5 to 40 wt % of metal fibers or metal particles, the total amount of the above-mentioned components being 100 wt % or less relative to the whole sliding friction material, and

(10) the sliding friction material according to the above (9), wherein the axial width of the land including a site having contact with the sliding surface of the sliding partner material first is narrower than the axial widths of the other lands.

Advantageous Effects of Invention

The sliding friction material of the present invention is excellent in friction performance and abrasion resistance, and also in sticking resistance.

DESCRIPTION OF EMBODIMENTS

Hereafter, embodiments of the invention will be described taking a synchronizer ring as an example.

Figure 1:
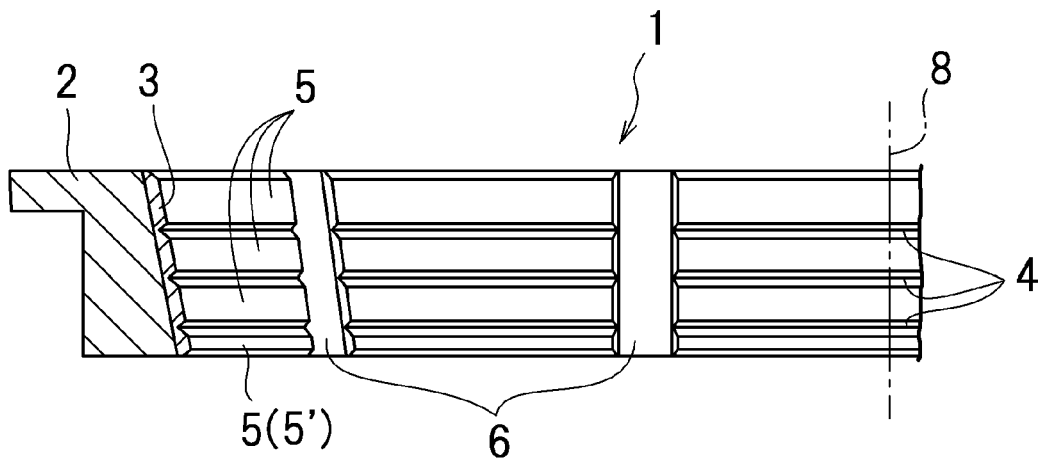
FIG. 1 is an axial cross-sectional view of a synchronizer ring.

FIG. 1 shows a synchronizer ring of the present invention. A synchronizer ring 1 comprises a base material 2, which is made of brass or the like, and a friction material 3 on the inner surface of the base material. Further, the friction material 3 preferably comprises, for smooth oil flow, an oil groove 4 running in a circumferential direction and a longitudinal groove 6 running in an axial direction.

Figure 2:
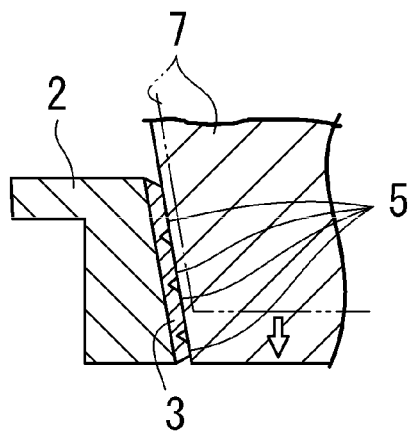
FIG. 2 shows a contact state between a synchronizer ring and the conical part of a partner gear.

FIG. 2 shows a contact state between the friction material 3 of the synchronizer ring and a sliding partner material 7. The synchronizer ring and the sliding partner material coaxially rotate around the rotation axis 8 at different peripheral speeds. At the time of speed change, the sliding partner material 7 is inserted into the synchronizer ring and pressed against the friction material 3, and continues to be in sliding contact until the peripheral speeds become equal.

The sliding friction material of the present invention is characterized by that, at the beginning of use, only part of the whole sliding surfaces of the friction material 3 is in contact with the sliding partner material 7. The subsequent period during which the area in contact with the sliding partner material gradually increases over time to full-area contact is called initial running-in period.

Since only part of the whole sliding surfaces is in contact at the beginning of use, sticking resistance in the initial running-in period is improved, and since the area in contact increases over time to full-area contact, where the whole of the sliding surfaces 5 is in contact, deterioration in friction performance and abrasion resistance can be reduced.

Herein, the full-area contact refers to a state where all sliding surfaces designed to be functional are fully in contact. For example, FIG. 2 shows a state of full-area contact, where chamfered surface at an edge or the like is not in contact with the sliding partner material but all surfaces functional as a sliding friction surface are fully in contact. In contrast, in the state where only part of the whole sliding surfaces is in contact at the beginning of use, not all of functionally necessary sliding surfaces but only part thereof is in contact. For example, in FIG. 4, all of the sliding surfaces 5 are functionally necessary, but at the beginning of use, among the sliding surfaces 5, only the initial sliding surface 5' or only the initial sliding surface 5' and the vicinity thereof are in contact, that is, only part of the whole sliding surfaces is in contact. Herein, the vicinity of the initial sliding surface 5' refers to a sliding surface adjacent to the initial sliding surface 5', a sliding surface adjacent to the adjacent sliding surface, and the like. The "part" above is usually about 1 to 20% of the whole sliding surfaces. Also, the period to full-area contact is preferably from the beginning of use to the time when, of 10 values of kinetic friction coefficient obtained in 10-time measurement with loading at given conditions, the minimum value relative to the maximum value becomes 98% or higher.

There may be various methods for partializing the contact between the friction material 3 and the sliding partner material 7 before the initial running-in period, and examples thereof include the following.

Figure 3:
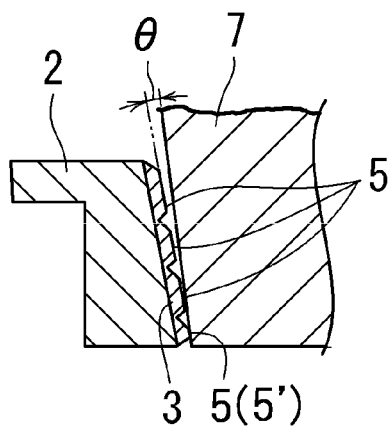
FIG. 3 shows a contact state where a relative taper angle between the friction material and a sliding partner material is provided.

FIG. 3 shows a state where a relative taper angle θ between the friction material 3 and the sliding partner material 7 is provided. That is, the sliding surfaces 5 of the friction material 3 and the outer surface of the sliding partner material 7 are on two different conical surfaces around a rotation axis 8, and the taper angles of the two conical surfaces to the rotation axis 8 have a difference represented by the above-mentioned relative taper angle θ. According to this example, before the initial running-in period, only a part of the multiple sliding surfaces 5, that is, the initial sliding surface 5' or the initial sliding surface 5' and the vicinity thereof are in contact. At the end of the initial running-in period, as a result of gradual abrasion of the friction material, all of the sliding surfaces 5 are fully in contact as shown in FIG. 2.

The relative taper angle θ of at least 1 minute improves sticking resistance, but the angle of 40 minutes or more reduces abrasion resistance in the initial running-in period. In FIG. 3, θ is shown as an angle opening at the large end side, but may be an angle opening at the small end side.

Figure 4:
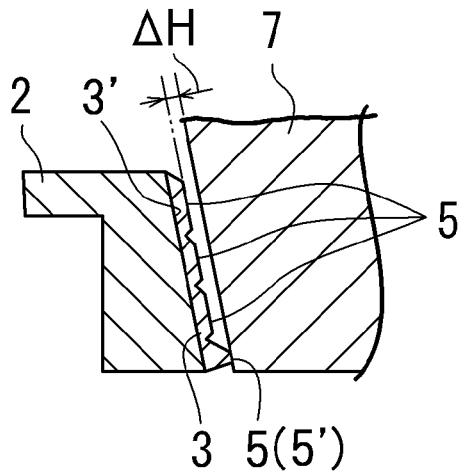
FIG. 4 shows a contact state where the height of the site which has contact with the sliding partner material first is larger than the heights of the other contact sites.

FIG. 4 shows a state where the initial sliding surface 5' including a site having contact first at each operation is higher than the other sliding surfaces 5. Herein, the height of the sliding surface 5 or the initial sliding surface 5' is a height toward the outer surface of the sliding partner material 7 facing the sliding surfaces. For example, the height refers to, in the case where the base surface 3' of the friction material 3 is formed in parallel to the outer surface of the sliding partner material 7, the height from the base surface 3'. As shown in FIG. 4, when only the initial sliding surface 5' is higher than the other sliding surfaces, only the initial sliding surface 5' is in contact with the sliding partner material 7 during the initial running-in period. As in the above case where a relative taper angle is provided, the contact between the friction material 3 and the sliding partner material 7 in the initial running-in period can be partially restricted. When the difference in height ΔH between the initial sliding surface 5' and the lowest sliding surface of all sliding surfaces 5 is at least 0.01 mm, it is sufficient for an improved sticking resistance in the initial running-in period.

Figure 5:
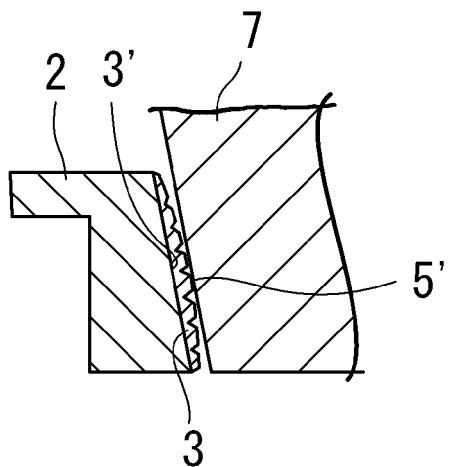
FIG. 5 shows a contact state where the height of the site which has contact with the sliding partner material first continuously changes in an axial direction.
Figure 6:
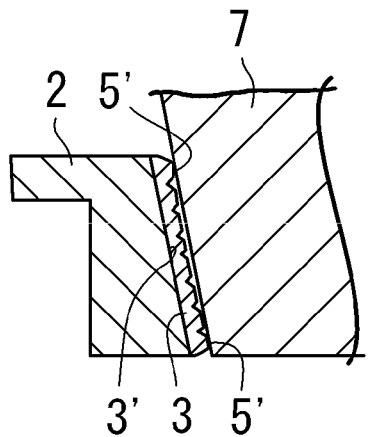
FIG. 6 shows a contact state where two or more sites are in contact with the sliding partner material first.

Also, as shown in FIGS. 5 and 6, the height of the site which has contact first may continuously change in an axial direction. In this case, in the initial running-in period, only the initial sliding surface 5', or only the initial sliding surface 5' and the vicinity thereof are in contact with the sliding partner material 7. The method for partially restricting the contact at each operation at the beginning of use is not limited to the above examples.

With the above constitution, the contact between the friction material 3 and the sliding partner material 7 at the beginning of use can be partially restricted. In this case, the smaller the contact area is, the more the sticking resistance is improved, but the more the abrasion resistance is reduced. In particular, when the axial width of a land including the site of the friction material 3 in contact with the sliding partner material 7 first is less than 0.1 mm, the abrasion resistance is reduced, and when the width is more than 1.0 mm, the sticking resistance in the initial running-in period is reduced. More preferred for an improved sticking resistance is 0.7 mm or less. Herein, the land refers to a relatively higher portion produced by formation of oil grooves, or a higher portion of the whole sliding surfaces. Among such lands, the land of the above initial sliding surface 5' preferably has a narrower axial width than those of the other sliding surfaces 5.

Based on the prior art, components of the friction material 3 are known to have the properties shown below.

The phenolic resin serves as a binder for other components of the friction material, and improves the stiffness of the friction material. The phenolic resin content less than 5 wt % lowers the stiffness of the friction material. The phenolic resin content exceeding 40 wt % fails to increase the coefficient of kinetic friction.

The carbon material is excellent in heat resistance and improves the heat resistance of the friction material. The carbon material content less than 30 wt % reduces the heat resistance of the friction material, and the content exceeding 80 wt % reduces the stiffness of the friction material.

The inorganic fibers and the inorganic particles reinforce the phenolic resin serving as a binder. The inorganic fiber and inorganic particle content less than 5 wt % is insufficient for reinforcing the phenolic resin. The inorganic fiber and inorganic particle content exceeding 40 wt % impairs the flexibility of the friction material, causing the friction material layer to wear a partner member.

The metal fibers and the metal particles prevent the reduction of the coefficient of kinetic friction of the friction material caused by braking friction heat. The metal fiber and metal particle content less than 5 wt % leads to a reduced coefficient of kinetic friction of the friction material. The metal fiber and metal particle content exceeding 40 wt % may cause the synchronizer ring to adhere to the partner member.

EXAMPLE

Hereafter, the present invention will be described by referring to an example.

As shown in FIG. 1, a synchronizer ring 1 comprises a base material 2 made of brass or the like, and a friction material 3 on the inner surface of the base material. As for the base material 2, a ring-shaped structure made of the above-mentioned substance is preformed by hot forging, and then further formed into a desired shape by machining. As for the friction material, a mixture of 15 wt % of phenolic resin, 65 wt % of calcined coke as a carbon material, and 20 wt % of wollastonite as inorganic fibers, is applied to the inner surface of the base material 2, where an adhesive has been applied beforehand, and then calcining is performed.

That is, the inner surface of the ring structure, which is previously subjected to ground treatment by blasting or the like, is washed with alcohol or the like, and a thermosetting adhesive such as a phenolic resin and an epoxy resin is applied to the inner surface. Subsequently, the ring structure is placed in a thermostatic chamber or the like and kept under an atmosphere of 70 to 120° C. for 10 to 30 minutes so that the adhesive is dried. The ring structure is set into a lower die of molding dies. Thereafter, the friction material is introduced and packed into the cavity formed between the inner surface of the ring structure and the outer surface of a core. Using a conventional oil hydraulic press machine or the like, the friction material is compressed by means of a punch of an upper die to be pre-molded at a die temperature within the range from normal temperature to 50° C. The molding dies are then placed on a heating platen preset at 180 to 300° C. in a conventional straight hydraulic molding machine, and the material is calcined (heated and press-molded) for 5 to 30 minutes to form a friction material layer integrated with the ring structure.

The calcined friction material is further machined as shown in the cross-sectional view of FIG. 3. The taper angle of the sliding surface to the axis is set at 7°+θ. Herein, θ is the relative taper angle between the friction material 3 and the partner gear conical part 7, which is the sliding partner material. In addition, multiple oil grooves running in a circumferential direction and longitudinal grooves 6 as shown in FIG. 1 are also formed.

Next, results of various tests of the sliding friction material for synchronizer rings of the Example will be described.

<Stick Resistance>

For evaluation of stick resistance (degree of inhibition of sticking to a conical sliding surface of a partner gear with a relative rotation speed near zero), a synchronization unit lapping test in inertia-absorbing test mode was performed as follows.

In a synchronization unit test machine, the inertial weight was set at 0.001 kgf·m·sec$^2$, and the synchronizer ring 1 was placed in a transmission oil (oil kind: Honda MTF-III) under a lubricating environment of 30 mL/min at normal temperature (30° C.). The synchronizer ring 1 was repeatedly pressed at a pressing force of 500 N by hydraulic control against a tapered partner member (name: gear cone; material: SCM420; heat treatment: carburized quenching and tempering; tapered face: processed by grinding) rotating at a differential rotational speed of 500 rpm, and the stick torque was measured over time. The stick torque refers to the torque with which the synchronizer ring 1 is released from the tapered partner member when the tapered partner member is accelerated to a defined differential rotational speed after synchronization is once established by absorption of the differential rotational speed. The evaluation of stick resistance in the synchronization unit lapping test was based on the "initial stick torque" as the maximum stick torque of the first 50 measured values.

Figure 7:
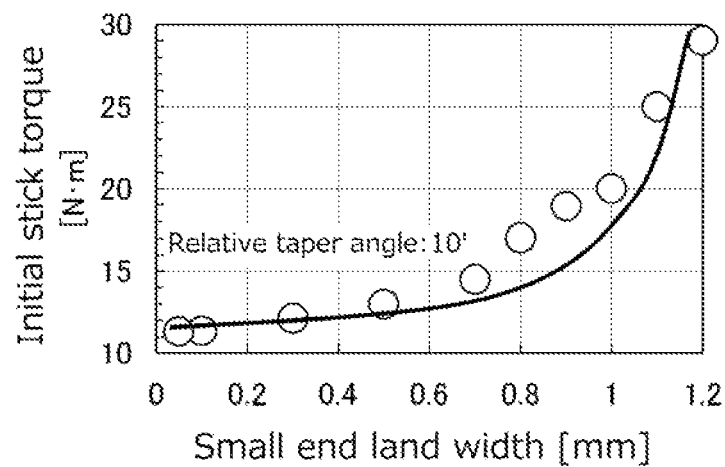
FIG. 7 shows the relationship between the small end land width and the initial stick torque.
Figure 8:
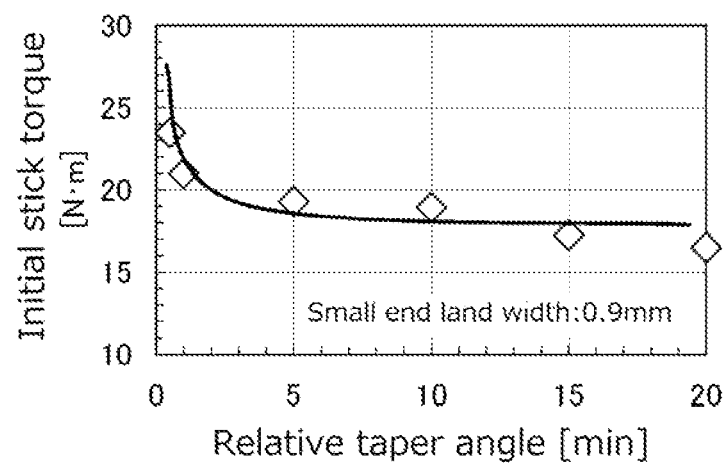
FIG. 8 shows the relationship between the relative taper angle θ and the initial stick torque.

FIG. 7 shows the relationship between the axial width of the land closest to the small end (small end land width) and the initial stick torque, and FIG. 8 shows the relationship between the relative taper angle θ and the initial stick torque. Herein, the land refers to a relatively higher portion produced by formation of oil grooves. In this Example, the small end land width refers to the axial contact width of a land including the site which has contact with the sliding partner material first. As shown in FIG. 7, as the small end land width becomes narrower, the initial stick torque decreases. In particular, in the range where the small end land width is below 1 mm, the initial stick torque greatly decreases. Furthermore, in the range where the small end land width is below 0.7 mm, the effect is more significant. Also, as shown in FIG. 8, as the relative taper angle θ becomes greater, the initial stick torque decreases, and in particular in the range where the angle is 1 minute or more, the effect is significant.

<Friction Performance>

For evaluation of friction performance, a synchronization unit performance test in inertia-absorbing test mode was performed as follows. In a synchronization unit test machine, the inertial weight was set at 0.002 kgf·m·sec², and the synchronizer ring 1 was placed in a transmission oil (oil kind: Honda MTF-III) under a lubricating environment of 80 mL/min at 80° C. The synchronizer ring 1 was repeatedly pressed 200 times at a pressing force of 500 N by hydraulic control against a tapered partner member (name: gear cone; material: SCM420; heat treatment: carburized quenching and tempering; tapered face: processed by grinding) rotating at a differential rotational speed of 1500 rpm, and the average coefficient of kinetic friction at the 200th time was determined. Evaluation of the average coefficient of kinetic friction was based on the average of the coefficients of kinetic friction determined during the synchronization established after the differential rotational speed was absorbed.

Figure 9:
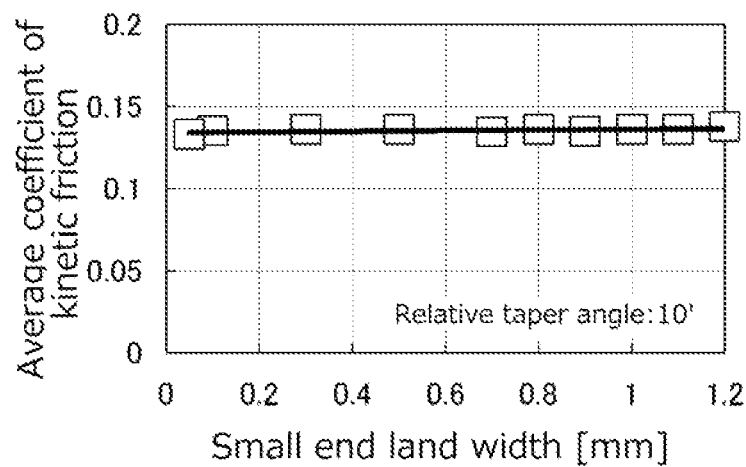
FIG. 9 shows the relationship between the small end land width and the average coefficient of kinetic friction.
Figure 10:
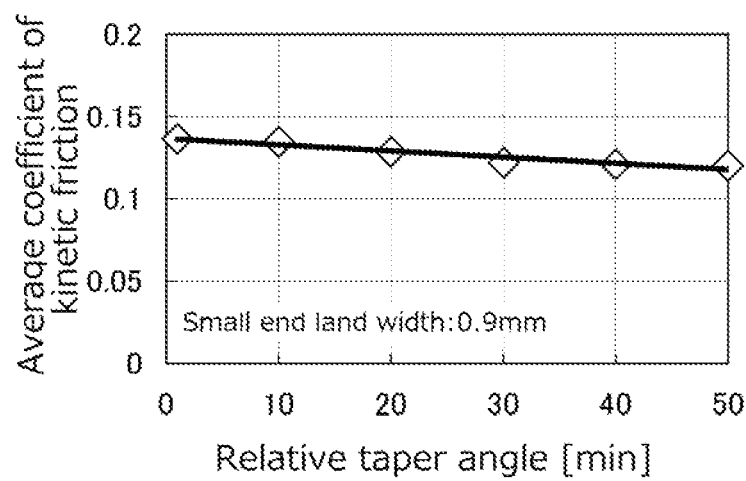
FIG. 10 shows the relationship between the relative taper angle θ and the average coefficient of kinetic friction.

FIG. 9 shows the relationship between the small end land width and the average coefficient of kinetic friction, and FIG. 10 shows the relationship between the relative taper angle θ and the average coefficient of kinetic friction. As shown in FIG. 9, even when the small end land width changes, the average coefficient of kinetic friction hardly changes. Also, when the relative taper angle θ is greater, the average coefficient of kinetic friction decreases not significantly but only slightly.

<Abrasion Resistance>

For evaluation of abrasion resistance, a synchronization unit duration test in inertia-absorbing test mode was performed as follows. In a synchronization unit test machine, the inertial weight was set at 0.003 kgf·m·sec², and the synchronizer ring 1 was placed in a transmission oil (oil kind: Honda MTF-III) under a lubricating environment of 80 mL/min at 80° C. The synchronizer ring 1 was repeatedly pressed 10000 times at a pressing force of 500 N by hydraulic control against a tapered partner member (name: gear cone; material: SCM420; heat treatment: carburized quenching and tempering; tapered face: processed by grinding) rotating at a differential rotational speed of 2500 rpm, and the abrasion loss was determined. Evaluation of the abrasion loss was based on the height reduction in the gear set state measured after the end of the test.

Figure 11:
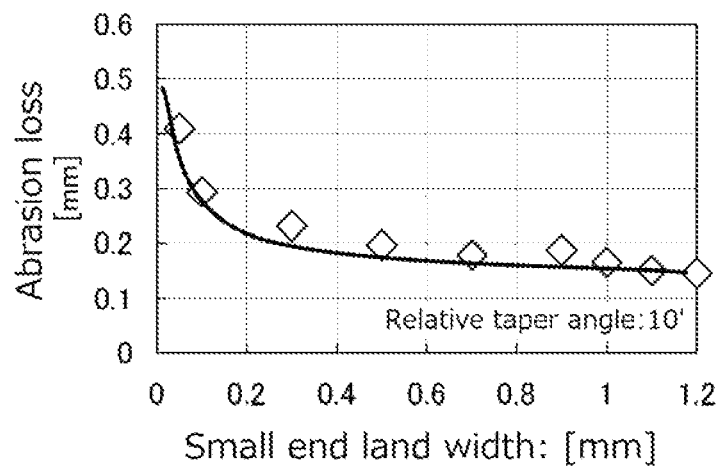
FIG. 11 shows the relationship between the small end land width and the abrasion loss.
Figure 12:
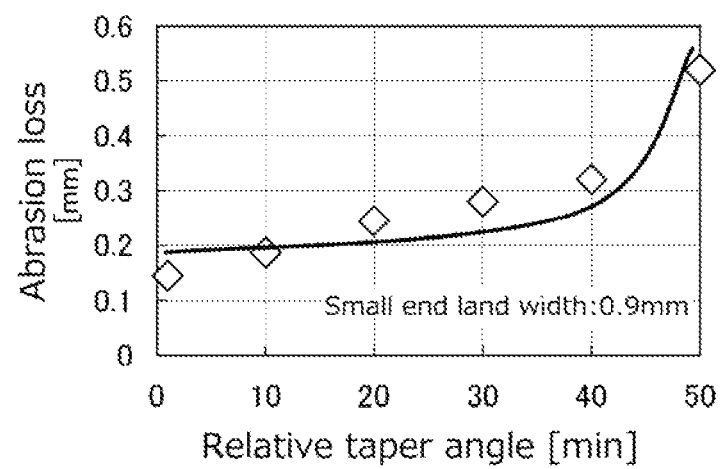
FIG. 12 shows the relationship between the relative taper angle θ and the abrasion loss.

FIG. 11 shows the relationship between the small end land width and the abrasion loss, and FIG. 12 shows the relationship between the relative taper angle θ and the abrasion loss. As shown in FIG. 11, as the small end land width becomes narrower, the abrasion loss becomes larger, and in particular in the range where the small end land width is below 0.1 mm, the abrasion loss sharply increases. Also, as shown in FIG. 12, as the relative taper angle θ becomes greater, the abrasion loss becomes larger, and in particular in the range where the angle exceeds 40 minutes, the abrasion loss sharply increases.

INDUSTRIAL APPLICABILITY

The sliding friction material of the present invention is useful as a sliding material excellent in friction performance and abrasion resistance, and also in sticking resistance.

References Signs List 1. synchronizer ring
2. base material
3. friction material
3'. base surface of friction material
4. circumferential oil groove
5. sliding surfaces
5'. initial sliding surface
6. longitudinal groove 6
7. conical part of partner gear
8. rotation axis
θ relative taper angle between friction material and partner gear conical part
ΔH difference in height between the site having contact with sliding partner material first and the other contact sites

The invention claimed is;

1. A sliding friction material including sliding surfaces, wherein the sliding friction material is configured such that the sliding surfaces are only partially in contact with a sliding surface of a sliding partner material at a beginning of use and an area in contact with the sliding partner material gradually increases over time to full-area contact during an initial running-in period,
wherein a relative angle of the sliding surfaces of the sliding friction material to the sliding surface of the sliding partner material before the initial running-in period is 1 to 40 minutes.

2. The sliding friction material according to claim 1, wherein the sliding surfaces of the sliding friction material include a highest sliding surface and a lowest sliding surface before the initial running-in period, the highest sliding surface being configured and arranged to contact the sliding partner material before the lowest sliding surface, and
wherein the highest sliding surface is 0.01 mm or more higher than the lowest sliding surface before the initial running-in period.

3. A synchronizer ring comprising:
a base material; and
the friction material of claim 2 disposed on the base material.

4. The sliding friction material according to claim 1, which has a groove on the surface thereof.

5. A synchronizer ring comprising:
a base material; and
the friction material of claim 4 disposed on the base material.

6. The sliding friction material according to claim 1, comprising 5 to 40 wt % of phenolic resin relative to the whole sliding friction material.

7. The sliding friction material according to claim 6, further comprising 30 to 80 wt % of carbon material, 5 to 40 wt % of inorganic fibers or inorganic particles, and the total amount of the above-mentioned components being 100 wt % or less relative to the whole sliding friction material.

8. A synchronizer ring comprising:
a base material; and
the friction material of claim 7 disposed on the base material.

9. A synchronizer ring comprising:
a base material; and
the friction material of claim 6 disposed on the base material.

10. The sliding friction material according to claim 1, which is a friction material for synchronizer rings.

11. The sliding friction material according to claim 10, wherein an axial width of a land including a site having contact with the sliding surface of the sliding partner material first is 0.1 to 1.0 mm.

12. The sliding friction material according to claim 10, wherein an axial width of a land including a site having contact with the sliding surface of the sliding partner material first is 0.1 to 0.7 mm.

13. A synchronizer ring comprising:
a base material; and
the friction material of claim 1 disposed on the base material.

14. A sliding friction material including sliding surfaces,
wherein the sliding friction material is configured such that the sliding surfaces are only partially in contact with a sliding surface of a sliding partner material at a beginning of use and an area in contact with the sliding partner material gradually increases over time to full-area contact during an initial running-in period,
wherein a relative angle of the sliding surfaces of the sliding friction material to the sliding surface of the sliding partner material before the initial running-in period is 1 to 20 minutes,
wherein the surface of the sliding friction material has a circumferential groove,
wherein the sliding surface of the sliding friction material includes a land which is configured and arranged to come into contact with the sliding partner material first, and an axial width of the land is 0.1 to 0.7 mm,
wherein the sliding friction material comprises 5 to 40 wt % of phenolic resin relative to the whole sliding friction material, and further comprises 30 to 80 wt % of carbon material, 5 to 40 wt % of inorganic fibers or inorganic particles, and the total amount of the above-mentioned components being 100 wt % or less relative to the whole sliding friction material.

15. The sliding friction material according to claim 14, wherein the land is a first land, and the sliding surface of the sliding friction material further comprises a second land, and
wherein the axial width of the first land is narrower than an axial width of the second land.

16. A synchronizer ring comprising:
a base material; and
the friction material of claim 15 disposed on the base material.

17. A synchronizer ring comprising:
a base material; and
the friction material of claim 14 disposed on the base material.

18. A combination comprising a synchronizer ring and a partner gear,
wherein the synchronizer ring includes a base material and a sliding friction material including sliding surfaces, the sliding friction material being disposed on the base material,
wherein the partner gear includes a conical surface which slides against the sliding friction material of the synchronizer ring,
wherein the sliding friction material is configured such that the sliding surfaces are only partially in contact with a sliding surface of the conical surface of the partner gear at a beginning of use and an area in contact with the sliding partner material gradually increases over time to full-area contact during an initial running-in period,
wherein the sliding surface of the sliding friction material includes a land which is configured and arranged to come into contact with the sliding partner material first, and an axial width of the land is 0.1 to 1.0 mm.

19. The combination of claim 18, wherein the land constitutes a highest sliding surface of the sliding friction material, and the sliding friction material further comprises a lowest sliding surface, the highest sliding surface being configured and arranged to contact the sliding partner material before the lowest sliding surface, and
wherein the highest sliding surface is 0.01 mm or more higher than the lowest sliding surface before the initial running-in period.

20. The combination of claim 19, wherein the sliding friction material comprises 5 to 40 wt % of phenolic resin relative to the whole sliding friction material, and further comprises 30 to 80 wt % of carbon material, 5 to 40 wt % of inorganic fibers or inorganic particles, and the total amount of the above-mentioned components being 100 wt % or less relative to the whole sliding friction material.

* * * * *